US00RE33921E

United States Patent [19]

McLaughlin et al.

[11] E Patent Number: Re. 33,921

[45] Reissued Date of Patent: May 12, 1992

[54] NCAP LIQUID CRYSTAL APPARATUS INCORPORATING A CONTROL MEANS AND ELECTRODE MEANS THEREOF INCORPORATING A CIRCUIT MEANS

[75] Inventors: Charles W. McLaughlin, Portola Valley; James L. Fergason, Atherton; Robert Parker, Alamo, all of Calif.

[73] Assignee: Taliq Corporation, Sunnyvale, Calif.

[21] Appl. No.: 420,559

[22] Filed: Oct. 12, 1989

Related U.S. Patent Documents

Reissue of:

[64] Patent No.: 4,699,470
Issued: Oct. 13, 1987
Appl. No.: 620,377
Filed: Jun. 12, 1984

[51] Int. Cl.[5] ..... G02F 1/13

[52] U.S. Cl. ..... 359/85; 359/87

[58] Field of Search ..... 350/331 R, 332, 334, 350/336

[56] References Cited

U.S. PATENT DOCUMENTS

| | | | |
|---|---|---|---|
| 3,617,374 | 11/1971 | Hodson et al. | 117/212 |
| 3,765,747 | 11/1973 | Pankratz et al. | 350/160 |
| 4,015,422 | 4/1977 | Van Haaften | 58/88 |
| 4,058,970 | 11/1977 | Ichinose | 350/332 |
| 4,394,067 | 7/1983 | Spruijt et al. | 350/334 |
| 4,419,399 | 12/1983 | Ichikawa et al. | 350/334 |
| 4,435,047 | 3/1984 | Fergason | 350/347 V |
| 4,456,335 | 6/1984 | Mumford | 350/331 R |
| 4,468,659 | 8/1984 | Ohba et al. | 340/719 |
| 4,549,174 | 10/1985 | Funada et al. | 340/784 |
| 4,556,289 | 12/1985 | Fergason | 350/350 |
| 4,579,423 | 4/1986 | Fergason | 350/334 |
| 4,596,445 | 6/1986 | Fergason | 350/339 |
| 4,603,945 | 8/1986 | Fergason | 350/331 |
| 4,606,611 | 8/1986 | Fergason | 350/334 |
| 4,613,207 | 9/1986 | Fergason | 350/331 |
| 4,616,903 | 10/1986 | Fergason | 350/334 |
| 4,662,720 | 5/1987 | Fergason | 350/339 |
| 4,669,828 | 6/1987 | Parker | 350/339 |
| 4,707,080 | 11/1987 | Fergason | 350/334 |

FOREIGN PATENT DOCUMENTS

| | | |
|---|---|---|
| 2332253 | 1/1975 | Fed. Rep. of Germany . |
| 2604462 | 8/1977 | Fed. Rep. of Germany . |
| 2108307 | 5/1983 | United Kingdom . |

*Primary Examiner*—Stanley D. Miller
*Assistant Examiner*—Anita Pellman Gross
*Attorney, Agent, or Firm*—Heller, Ehrman, White & McAuliffe

[57] ABSTRACT

A liquid crystal apparatus comprising a nematic curvilinearly aligned phases liquid crystal material located between two electrodes wherein a control element is incorporated into the electrodes. The electrodes may also form a circuit means integral therewith for selectively applying an electric field across the liquid crystal material.

45 Claims, 2 Drawing Sheets

NCAP LIQUID CRYSTAL APPARATUS INCORPORATING A CONTROL MEANS AND ELECTRODE MEANS THEREOF INCORPORATING A CIRCUIT MEANS

Matter enclosed in heavy brackets [ ] appears in the original patent but forms no part of this reissue specification; matter printed in italics indicates the additions made by reissue.

BACKGROUND OF THE INVENTION

The present invention relates generally to liquid crystal, and more particularly to a nematic curvilinearly aligned phases ("NCAP") liquid crystal apparatus incorporating a control means therein wherein the apparatus may have an electrode means forming a circuit means integral therewith.

Liquid crystals are used in a wide variety of devices, including visual display devices. The property of liquid crystals that enables them to be used, for example, in visual displays, is the ability of liquid crystals to transmit light on one hand, and to scatter light and/or to absorb it (especially when combined with an appropriate dye), on the other, depending on whether the liquid crystals are in a relatively free, that is de-energized or field-off state, or in a strictly aligned, that is energized or field-on state. An electric field selectively applied across the liquid crystals can be used to switch between field-off and field-on states.

There are three categories of liquid crystal materials, namely, cholesteric, nematic and smectic. The present invention relates in the preferred embodiment described hereinafter to the use of nematic liquid crystal which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. A more detailed explanation of operationally nematic liquid crystal material is provided in co-pending U.S. patent application Ser. No. 477,242, filed Mar. 21, 1983, now U.S. Pat. No. 4,616,903, in the name of Fergason, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984, in the name of Fergason, entitled ENCAPSULATED LIQUID CRYSTAL AND METHOD, assigned to Manchester R&D Partnership, which disclosure is also hereby incorporated by reference.

It is to be understood, however, that the present invention may be employed with any of the various types of liquid crystal materials or combinations, including combinations with dyes. Designation of the apparatus of the present invention as a NCAP liquid crystal apparatus or reference to NCAP liquid crystal is in no way intended to limit such apparatus to use with nematic liquid crystal materials. It is only for the sake of convenience and in an effort to use an abbreviated term that describes the present invention that reference is made to NCAP liquid crystal. Particularly, the term NCAP is used because the preferred liquid crystal material is nematic or operationally nematic liquid crystal and because in the field-off condition, or any other condition which results in the liquid crystal being in a distorted or randomly aligned state, the liquid crystal structure is distorted to a curved form (hence curvilinearly aligned) wherein the spatial average orientation of the liquid crystal material over a capsule-like volume, for instance, is strongly curved and there is no substantial parallel directional orientation of the liquid crystal in the absence of a prescribed input, for example, an electric field.

NCAP liquid crystal and a method of making the same and devices using NCAP liquid crystals are described in detail in the above-identified U.S. Pat. No. 4,435,047. Briefly, NCAP liquid crystal comprises a liquid crystal material that is dispersed in an encapsulating medium. A NCAP liquid crystal apparatus is an apparatus formed of NCAP liquid crystals that are capable of providing a function of the type typically inuring to a liquid crystal material. For example, such a NCAP liquid crystal apparatus may be a visual display device that responds to the application and removal of an electric field to effect a selected attenuation of visible light.

Such NCAP liquid crystal apparatus may commonly include NCAP liquid crystals positioned between two electrodes wherein the electrodes are located on respective substrates. The electrodes are typically interconnected to a voltage source by means of a suitable circuit. The circuit permits an electric field to be selectively applied across the NCAP liquid crystals to switch the crystals between an energized and de-energized state. A control element is normally provided to control the application of the electric field. In accordance with the present invention, the control element may be integrated into the NCAP liquid crystal apparatus.

An object of the present invention is to provide a liquid crystal apparatus having a relatively high quality of operation and satisfactory contrast and including a control means incorporated therein.

Another object of the present invention is to provide a liquid crystal apparatus which permits efficient and high quality functioning of a liquid crystal material in response to excitation or non-excitation by an external source wherein the liquid crystal apparatus includes a control means for controlling the application of the external source.

A further object of the present invention is to provide a NCAP liquid crystal apparatus including an electrode means forming a circuit means integral therewith for energizing the electrode means to apply an electric field across the liquid crystal material.

SUMMARY OF THE INVENTION

As may be seen hereinafter, the liquid crystal apparatus disclosed herein is one which includes NCAP liquid crystal. NCAP liquid crystal comprises a liquid crystal material and containment means for inducing a generally non-parallel alignment of said liquid crystal material which in response to such alignment at least one of scatters and absorbs light and which in response to a prescribed input reduces the amount of such scattering or absorption.

The prescribed input is preferably of the electromagnetic type and, more particularly, an electric field. Electrode means are provided to apply the electric field. The electrode means may comprise a pair of electrodes located on opposite sides of the combination of the liquid crystal material and the containment means. Such electrodes may be formed on respective substrates. At least one of the substrates has an opening formed therein through which a portion of a control element may extend. The function of the control element may be to control the application of the electric field across the liquid crystal material. The control element could also function to control an operation of a device of which the NCAP liquid crystal apparatus is a part.

Also in accordance with the present invention, an electrode of the NCAP apparatus may form a circuit means integral therewith for energizing the electrodes to apply the electric field across the liquid crystal material. Such an electrode may be formed on a printed circuit board or, alternatively, on a film that includes a circuit means for energizing the electrodes. The printed circuit board or film forms a back plane of the apparatus which may support a preestablished pattern of conductive segments.

BRIEF DESCRIPTION OF THE DRAWINGS

The liquid crystal apparatus of the present invention will be described in more detail hereinafter in conjunction with the drawings wherein.

DESCRIPTION OF THE PREFERRED EMBODIMENTS

Figure 1:
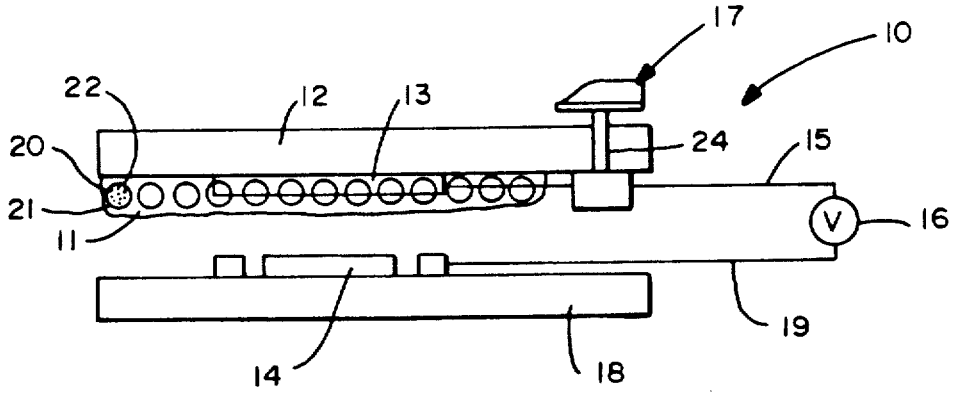
FIG. 1 is a schematic view illustrating a NCAP liquid crystal apparatus in accordance with the present invention.

Referring now to the drawings, attention is first directed to FIG. 1. FIG. 1 shows a NCAP liquid crystal apparatus indicated generally by reference numeral 10. The apparatus includes a layer or layers of NCAP liquid crystal 11 supported on a substrate 12 having an electrode 13 located thereon. The apparatus further includes a second electrode 14 mounted on a substrate 18.

The NCAP liquid crystal material 11 may include a liquid crystal material 20 more or less contained within the confines or the interior volume 21 of a capsule 22 or an encapsulating medium. The NCAP liquid crystal material comprises a plurality of such capsules or an encapsulating medium in which liquid crystal material is dispersed.

A quantity of liquid crystal material is confined or contained in volumes within the encapsulating medium, for example in a solid medium as individual capsules or dried stable emulsions. Such volumes may be discrete volumes, that is once formed, they ordinarily remain as individually distinct entities or separate entities. Such separate entities or discrete volumes, moreover, may also be interconnected, for example, by one or more passages. The liquid crystal material would preferably be in both the discrete volumes and in such interconnecting passages. Thus, the internal volumes of respective capsules may be fluidly coupled via one or more interconnecting passages. All of the aspects and features of the present invention vis-a-vis individual unconnected capsules have been found to be applicable to an arrangement of capsules that have one or more interconnecting passages.

A voltage may be applied to electrodes 13 and 14, and hence across liquid crystal 11 from an AC or DC voltage source 16. Voltage source 16 is connected to the electrodes by electrical leads 15 and 19 and through a control element 17. In the embodiment shown, control element 17 is a variable resistor (potentiometer) of the electromechanical type that is well known in the art. The variable resistor is used to adjust and control the voltage applied across NCAP liquid crystal 11. As the voltage applied thereacross is increased, the attenuation of light by the NCAP liquid material is decreased, and similarly as the voltage is decreased, the attenuation of light is increased. As shown and as will be discussed below, control element 17 extends through substrate 12 to be integrated into NCAP apparatus 10.

It should be understood that control element 17 may be any appropriate device for controlling the electric field applied across the NCAP liquid crystal material. For instance, control element 17 may be a selectively closeable switch. In that case, when the switch is closed, apparatus 10 is in an energized or field-on state with the molecules of the liquid crystal material in the desired alignment to permit the transmission of light. When the switch is open, apparatus 10 is in a de-energized or field-off state such that the liquid crystal material scatters and/or absorbs light. See the above-identified U.S. Pat. No. 4,435,047, which has been incorporated by reference.

Mounting substrates 12 and 18, and electrodes 13 and 14 may be optically transmissive so that liquid crystal apparatus 10 can control the transmission of light therethrough in response to an electric field applied across electrodes 13 and 14. Alternatively, electrode 14 and/or substrate 18 may be optically reflective or may have thereon an optically reflective coating so that reflection by such reflective coating of incident light will be a function of whether there is an electric field applied across the liquid crystal 11.

Preferably, a plurality of NCAP liquid crystals 11 are applied to substrate 12 in a manner such that the NCAP liquid crystals adhere to electrode 13 and substrate 12. The material of which capsule 22 is formed is suitable for binding or otherwise adhering the capsule to the electrode and/or substrate. In one embodiment, capsule 22 is formed of a polyvinyl alcohol (PVA). In the preferred embodiment, the liquid crystal material is dispersed or entrapped in a latex medium. In either embodiment, substrate 12 may be a polyester film, such as Mylar®, that has been precoated wtih a 90 to 5000 ohms per square, and preferably 450±150 ohms per square, layer of indium tin oxide (ITO) to form electrode 13. Of course, materials other than ITO may be used to form the electrodes of the apparatus of the present invention. A Mylar® film with a precoated ITO electrode, known as Intrex, may be purchased from Sierracin of Sylmar, Calif.

As noted, latex entrapped NCAP liquid crystal is used in the preferred embodiment. Latex entrapped NCAP liquid crystal comprises the entrapment of liquid crystal in a latex medium. The latex is a suspension of particles. The particles may be natural rubber or synthetic polymers or copolymers. A latex medium is formed by drying a suspension of such particles. A further explanation of latex entrapped NCAP liquid crystal and methods of making the same are provided in U.S. patent application Ser. No. 591,433, filed Mar. 20, 1984, in the name of Pearlman, entitled LATEX ENTRAPPED NCAP LIQUID CRYSTAL COMPOSITION, METHOD AND APPARATUS, assigned to the assignee of the present invention, and which disclosure is hereby incorporated by reference.

Briefly, latex entrapped NCAP liquid crystal may be formed by mixing a suspension of latex particles and liquid crystal material wherein the liquid crystal material has been previously emulsified in an aqueous phase. Alternatively, all components may be combined prior to emulsifying the liquid crystal material. The mixture may then be applied to substrate 12 and electrode 13. As the mixture dries, it adheres to the electrode-coated side of the polyester film. When dried, the latex particles form a latex medium with particles of liquid crystal dispersed therein.

A specific method for making latex entrapped NCAP liquid crystal may comprise first emulsifying 36 grams of the liquid crystal ROTN701 (manufactured by Hoffman La Roche of New York, N.Y.) in a solution containing 14 grams of a 12% aqueous solution of PVA and 1 gram of the surfactant TWEEN 20 (available through ICI Americas Incorporated of Wilmington, Del.). The liquid crystal is added continuously while the solution is mixed with an impeller blade at 3500 RPM. When the particle size of the liquid crystal is about 1-5 microns, 49 grams of Neorez R-967 (manufactured by Polyvinyl Chemical Industries, Wilmington, Mass.), containing 40% latex particles by weight, is added with slow mixing of less than 1000 RPM until the mixture is homogenous. This material may then be cast with a doctor blade or other suitable means onto substrate 12 and electrode 13.

After the NCAP liquid crystal material has dried on electrode 13 and substrate 12, substrate 18 and electrode 14 may be laminated onto the surface of the latex entrapped NCAP liquid crystal material. Substrate 18 may also be a Mylar® film precoated with a 90 to 5000 ohms per square, preferably a 450±150 ohms per square, layer of ITO to form electrode 14. Electrode 14 and Mylar® film 18 are also preferably formed from the Intrex material.

As shown in FIG. 1, substrate 12 has a hole 24 formed therein to permit interconnection of control element 17 in the circuit that includes electrodes 13 and 14, and voltage source 16. Hole 24 may simply be drilled through substrate 12. A suitable conductive path or paths may be formed on the electrode-coated surface of substrate 12 to interconnect the control element to electrode 13. Liquid crystal display devices used heretofore present hard to overcome sealing problems if a hole is formed in a substrate thereof. The liquid crystal material of NCAP liquid crystal apparatus 10, however, will not escape through a hole formed in a supporting substrate, as the present invention provides for confinement of discrete quantities of liquid crystal material, for example, in capsules which permits each individual capsule or capsule-like volume to in effect operate as an independent liquid crystal device. The liquid crystal material is thus confined in an encapsulating medium with the result that the liquid crystal material cannot escape from its encapsulating medium.

This feature of the NCAP liquid apparatus permits elements such as control means 17 to be integrated directly into the NCAP apparatus by passing at least a portion of such an element through a passageway or hole formed in a supporting substrate. In this respect, a hole could also be formed in substrate 18 (see FIG. 5) for passage of a control element therethrough. The control element may also pass through the electrodes formed on the substrates.

An NCAP liquid crystal apparatus employing the present invention may be used in many different applications, including telephones, televisions, as well as other communications equipment, kitchen appliances, such as microwave ovens, automobile dashboard displays, automatic shading devices for windows, and a wealth of other applications.

Figure 2:
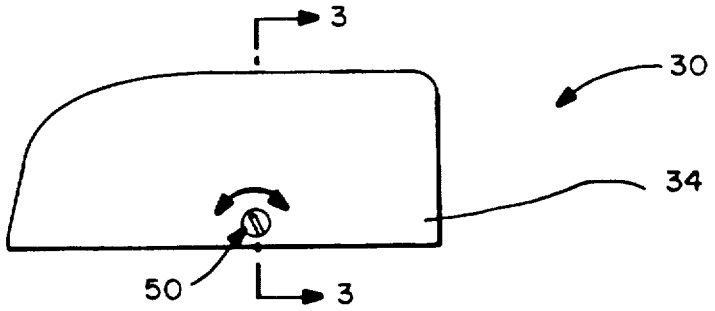
FIG. 2 is a schematic view that illustrates the NCAP liquid crystal apparatus of the present invention utilized in conjunction with a device for shading the window of an airplane.
Figure 3:
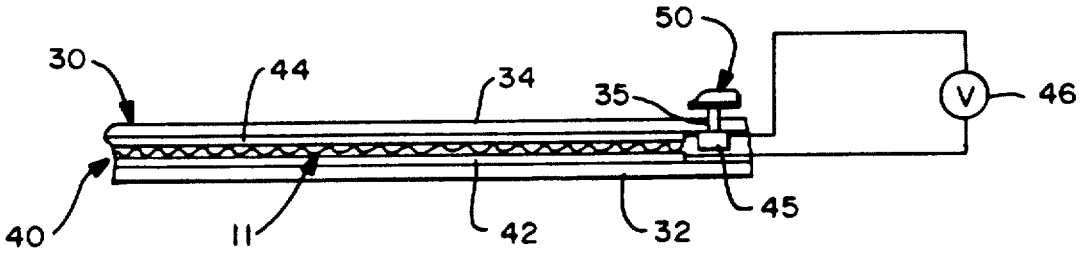
FIG. 3 is a schematic view along line 3—3 of FIG. 2.

FIGS. 2 and 3 illustrate the NCAP liquid crystal apparatus of the present invention utilized as a shading device for a passenger window of an airplane. As shown, the passenger window 30 comprises two sheets of clear, plastic material 32 and 34 between which is sandwiched a NCAP liquid crystal apparatus 40 employing the present invention. NCAP apparatus 40 includes two substrates 42 and 44 including appropriate electrodes (not illustrated) formed thereon. The NCAP liquid crystal material 11 is located between the respective electrodes and their mounting substrates.

Substrates 42 and 44, and the electrodes mounted thereon are optically transmissive so that liquid crystal apparatus 40 is capable of controlling the transmission of light therethrough in response to an electric field applied across the electrodes. A control element 50, which in this case is a variable resistor, is incorporated in the NCAP apparatus 40 and window 30 to control the application of the electric field applied across the electrodes, and thus the transmission of light through the cockpit window. As shown, control element 50 extends through respective holes 35 and 45 formed in the inside surface 34 of window 30 and substrate 44 of NCAP apparatus 40. The control element operatively couples the electrodes in a suitable circuit including a voltage source 46 for energizing the electrodes to apply an electric field thereacross. Control element 50 may be operated between two extremes where light passes through the cockpit window unattenuated or where maximum attenuation is achieved to provide maximum shading.

Figure 4:
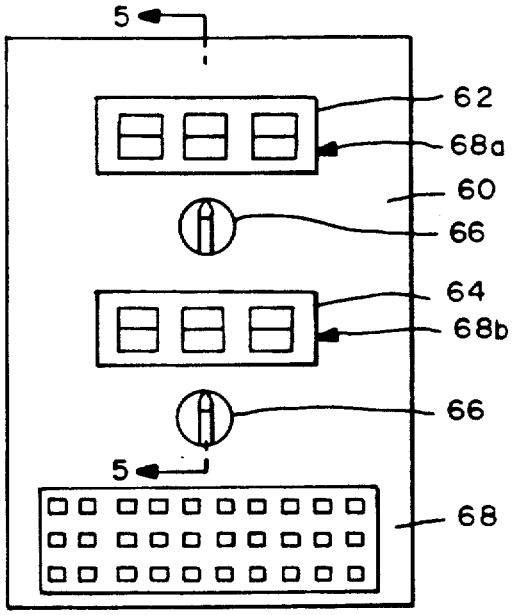
FIG. 4 is a schematic view of the NCAP liquid crystal apparatus of the present invention utilized in conjunction with a display and control panel for a microwave oven device.
Figure 5:
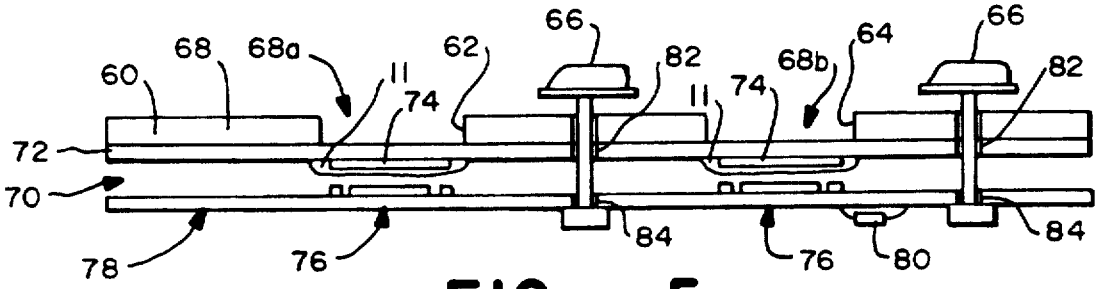
FIG. 5 is a schematic view along line 5—5 of FIG. 4.

FIGS. 4 and 5 illustrate another application of the present invention utilized in conjunction with a display and control panel 60 for a microwave oven. The display and control panel includes at least two display areas 62 and 64 and any number of control elements 66, such as variable resistors, switches, etc., for controlling the operation of the appliance or device. The displays may comprise a numeric display including three figure-eight patterns (as shown) wherein a figure-eight pattern is formed from seven electrically isolated conductive segments, each of which may be selectively energized to create various numerical characters.

Control panel 60 may include a facade or front plate 68 behind which is mounted a NCAP liquid crystal apparatus 70 that forms the displays 62 and 64. The facade 68 includes appropriate openings 68a and 68b for the display areas. The NCAP liquid crystal apparatus 70 includes a front substrate 72 having electrodes 74 located thereon. Substrate 72 and electrodes 74 are optically transmissive, and electrodes 74 are formed to have a rectangular shape that approximates the outline of the respective figure-eight patterns. Electrodes 74 are substantially parallel to the electrodes means forming the figure-eight patterns. Electrodes 74 and substrate 72 may be formed from the Intrex material discussed heretofore.

NCAP apparatus 70 further includes conductive segments, indicated generally by reference numeral 76, that form the various figure-eight patterns of the displays. Conductive segments 76 may be optically transmissive, or be optically reflective or have an optically reflective coating thereon to reflect light incident thereon. The NCAP liquid crystal material 11 is located, as discussed heretofore, between electrodes 74 and conductive segments 76 so that with the application of an electric field across selected ones of the electrodes and conductive segments a visual output display is effected.

As illustrated in FIG. 5, the conductive segments 76 of the figure-eight patterns are formed on a printed circuit board (PCB) 78 that includes the appropriate circuitry for driving the displays. Such an electronic drive may be performed in a single LSI metal oxide semiconductor (MOS) chip 80 mounted in a single dual-in-line package suitable for direct assembly on PCB 78. All the timing, logic, memory, resistors, and drivers for the displays are contained in chip 80. PCB 78 may also include appropriate circuitry for controlling one or more operations of the microwave oven.

PCB 78 may comprise a two-sided flexible substrate made of a polyimide material such as Kapton® (A registered trademark of E.I. duPont de Nemours and Company). In such an embodiment, the driver electronics would be connected to the Kapton® film with the electrodes 76 being formed on the film. The method and means of connecting such electronics to materials like Kapton® are known in the art, and as such they are not described in detail. Briefly, a method for forming a suitable electrode pattern on a polyimide material film for a numeric or alphanumeric display may comprise the following steps: coating the polyimide film with ITO or other suitable transparent electrode material, masking the display electrode pattern, depositing a conductor such as copper on the electronics sections of the film, forming through-holes and a circuit pattern in the electronics sections for connecting the display electrode pattern in circuit with discrete component or components of the drive circuitry, plating the through holes, and finally etching the prescribed display electrode pattern on the film.

The conductive segments or electrode means 76 thus have a circuit means formed integral therewith for selective application of an electric field across the liquid crystal material. This arrangement permits direct interior electrical connection (that is interior of the liquid crystal apparatus) between the circuit means and the electrode means.

Alternatively, PCB 78 may be a rigid two-sided or multilayer board constructed of such materials as phenolic paper laminates, polyimide glass or epoxy glass. For instance, the segmented electrodes 76 may be formed on an opaque rigid PCB such as one made of FR4 or G10. Suitable drive electronics would be included on the PCB. Electrodes 76 may be formed by coating the rigid board with a conductive layer of material, such as copper, and then using photoetching techniques, as are well known in the art, to form the prescribed electrode pattern thereon.

The prescribed electrode pattern formed on the board or back plane of the NCAP apparatus may be any desired pattern such as the well known sixteen segment "British Flag" arrangement of segments or a dot matrix of segments. If the electrode is formed on a board that is opaque, for example, one made from FR4, the display has to be operated in the absorption mode wherein the liquid crystal material is combined with a dye and light incident on the display is absorbed in the deenergized state and transmitted through the display in the energized state. In the absorption mode, the segmented electrodes formed on the PCB are preferably optically reflective or have an optically reflective coating thereon. If the electrodes are formed on a board that is transparent, or is translucent, such as Kapton®, the display may be operated either in the absorption or scattering mode. In the scattering mode, light incident on the display is isotropically scattered when the display is in the deenergized state and transmitted therethrough when the display is in the energized state. Isotropic scattering means that when a beam of light enters the liquid crystal material there is virtually no way to predict the exit angle of scattered light.

As illustrated in FIG. 5, the various electromechanical control elements 66 associated with the operation of the microwave oven extend through facade 68 and holes 82 formed in substrates 72 of NCAP apparatus 70. The control elements may be interconnected to circuitry on PCB 78. To this end, elements 66 extend through holes 84 formed in PCB 78. The NCAP apparatus 70 may be operatively coupled to the control elements 66 by suitable circuitry on PCB 78 so that the displays are effectively operated in conjunction with the operation of elements 66. However, elements 66 may control a function of the microwave oven or device that is unrelated to any data displayed by the NCAP apparatus. The elements 66, however, are still integrated into the NCAP apparatus to facilitate manufacturing of the device and to enhance the appearance of display and control panel 60.

Finally, it is noted that the control means extending through the substrate or substrates of the NCAP apparatus may be other than an electromechanical control element, for instance, one or more control elements 66 could be some sort of mechanical element.

Figure 6:
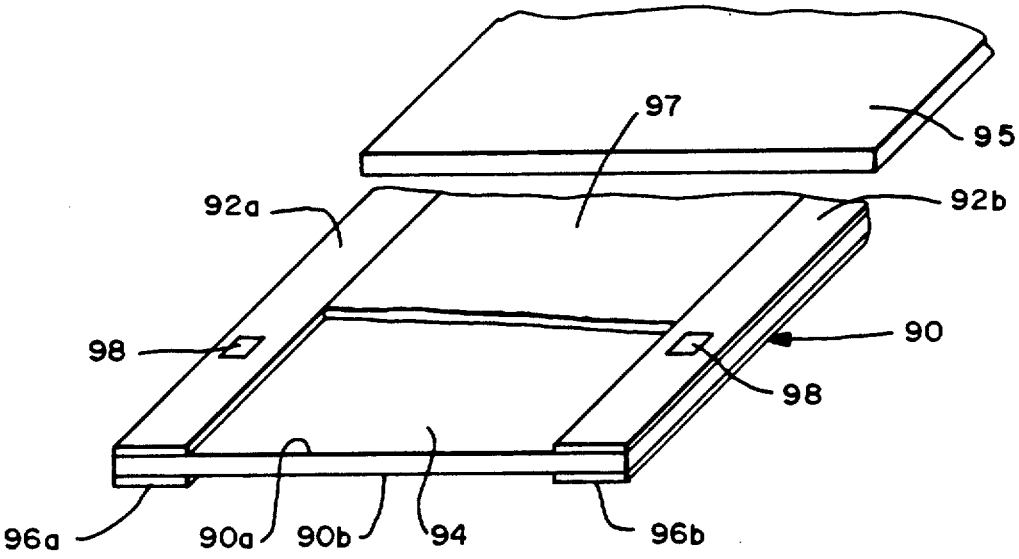
FIG. 6 is a schematic view illustrating another embodiment of the present invention wherein the display electrode pattern is formed on a film.

FIG. 6 illustrates another embodiment of the present invention wherein the display electrode pattern is formed on a high-temperature resistant, flexible film 90. The film has front and back surfaces 90a and 90b, respectively. The film may be substantially optically transparent to electromagnetic radiation in at least a portion of the visible range. An apparatus utilizing such a film could be operated in the scattering or absorption mode. The film may also be non-transparent, and an apparatus including such a film would be operated in the absorption mode. The film is also resistant to the high temperatures associated with the process (for example, soldering) of joining electronic components to the film. Examples of materials which film 90 may be fabricated from include polysufones and polyetherketone.

Film 90 includes opaque electronically-conductive paths or stripes 92a and 92b formed on the front surface of the film on the respective sides thereof. These stripes may be formed of copper. An ITO transparent coating 94 is also located on the front surface of the film to extend between and abut against the respective copper stripes. Copper stripes 96a and 96b may also be formed on the back surface of film 90. Preferably, stripes 96a and 96b are substantially aligned with and extend parallel to stripes 92a and 92b, respectively, so as not to interfere with the display electrode pattern.

The display electrode pattern is formed on ITO coating 94. The electronic component or components, such as MOS chips 98, for operating or driving the display are integrated into that part of the film bearing the copper stripes. Such drive components may be located on one or more of the copper stripes. The electronic circuit pattern for connecting these components to the display electrodes is also formed on a copper stripe wherein the circuit pattern is connected in circuit with the display electrode pattern at the junction of the ITO coating and copper stripe. The copper stripe in effect provides an integral mount for discrete circuit components for selective application of an electric field across the liquid crystal material, permitting direct interior electric connection between the circuit components and the electrode means.

The display electrode pattern and the electronic circuit pattern on the copper stripe or stripes may be silk-screened (or photo-masked) and etched on film 90 at the same time. Suitable holes would be punched or otherwise formed in the copper stripe portion of the film. For example, a hole could be punched through copper stripes 92a and 96a and the electronic component functioning as the drive circuit wave soldered therein. Electrical connections to the electronic components could then be made at the back surface of the film. In accordance with the present invention, the drive components may be located on the copper stripes on either one or both surfaces 90a and 90b of the film. Where the drive components are located on copper stripes 92a and/or 92b, it is preferable that a hole extend through the film, in the copper stripe portion thereof, to facilitate electrical interconnection of the component (to circuitry not shown) at the backside of the film.

After the display electrode pattern and the electronic circuit pattern have been formed on the film and the electronic components attached thereto, the NCAP liquid crystal material 97 may be applied to ITO coating 94 in the manner heretofore discussed. Subsequently, a substrate including an electrode formed thereon may be laminated onto the NCAP liquid crystal material to form a NCAP liquid crystal apparatus. As discussed, this electrically-conductive substrate 95 may be a Mylar® film with an ITO coating. Electrically-conductive substrate 95 would also preferably be interconnected to the drive circuitry on a copper stripe.

This embodiment of the present invention offers a number of advantages including the following: reliability and durability as the electrical connections between the drive components and the electrode display pattern are integrated to the apparatus, reduced cost, and added flexibility in manufacturing.

Although certain specific embodiments of the invention have been described herein in detail, the invention is not to be limited only to such embodiments, but rather only by the appended claims.

What is claimed is:

1. A liquid crystal apparatus, comprising:

a liquid crystal material and containment means for inducing a distorted alignment of said liquid crystal material which in response to such alignment at least one of scatters and absorbs light and which in response to an electric field reduces the amount of such scattering or absorption; and electrode means for applying said electric field wherein said electrode means incorporates an electromechanical control means integrally therein for controlling a prescribed function, said electromechanical control means extending through a substrate means that supports said electrode means.

2. The liquid crystal apparatus of claim 1 wherein said electrode means forms a circuit means integral therewith for energizing said electrode means to apply said electric field.

3. The liquid crystal apparatus of claim 2 wherein said electrode means permits direct interior electrical connection between said circuit means and said electrode means.

4. The liquid crystal apparatus of claim 1 wherein said electrode means provides an integral mount for discrete circuit components for energizing said electrode means to apply said electric field.

5. The liquid crystal apparatus of claims 2 or 4 wherein said electrode means forms a printed circuit.

6. The liquid crystal apparatus of claims 2 or 4 wherein at least part of said electrode means is formed on a high-temperature resistant film.

7. The liquid crystal apparatus of claim 4 wherein said electrode means permits direct interior electrical connection between said circuit components and said electrode means.

8. A liquid crystal apparatus, comprising:

a liquid crystal material and containment means for inducing a distorted alignment of said liquid crystal material which in response to such alignment at least one of scatters and absorbs light and which in response to an electric field reduces the amount of such scattering or absorption;

electrode means for applying said electric field;

substrate means for supporting said electrode means and the combination of said liquid crystal material and said containment means; and at least one electromechanical control element extending through a portion of said substrate means for controlling a prescribed function.

9. The liquid crystal apparatus of claim 8 forming part of a device wherein said electromechanical control element controls a function of said device.

10. The liquid crystal apparatus of claim 8 wherein there are at least two of said electrode means and the combination of said liquid crystal material and said containment means is located therebetween.

11. A liquid crystal apparatus, comprising:

a liquid crystal material and containment means for inducing a distorted alignment of said liquid crystal material which in response to such alignment at least one of scatters and absorbs light and which in response to an electric field reduces the amount of such scattering or absorption;

electrode means for applying said electric field;

substrate means for supporting said electrode means and the combination of said liquid crystal material and said containment means;

a circuit means for energizing said electrode means to apply said said electric field; and an electromechanical control element for controlling the application of said electric field extending through said substrate means to operatively couple said circuit means to said electrode means.

12. The liquid crystal apparatus of claim 11 wherein said electromechanical control element is a variable resistor.

13. The liquid crystal apparatus of claim 11 wherein said electromechanical control element is a selectively closable switch.

14. A liquid crystal apparatus, comprising:

a liquid crystal material and containment means for inducing a distorted alignment of said liquid crystal material which in response to such alignment at least one of scatters and absorbs light and which in response to an electric field reduces the amount of such scattering or absorption;

a first electrode means for applying said electric field;

a second electrode means for applying said electric field located on a printed circuit board on the side of the combination of said liquid crystal material and said containment means remote from said first electrode means; and an electromechanical control element extending through said printed circuit board for controlling a prescribed function.

15. The liquid crystal apparatus of claim 14 wherein said printed circuit board is substantially optically transparent to electromagnetic radiation in at least a portion of the visible range.

16. The liquid crystal apparatus of claim 14 wherein said printed circuit board is substantially opaque.

17. The liquid crystal apparatus of claim 14 further including a circuit means for energizing said first and second electrode means to apply said electric field, said circuit means included on said printed circuit board to be connected in circuit with said first and second electrode means.

18. A liquid crystal apparatus, comprising:

a liquid crystal material and containment means for inducing a distorted alignment of said liquid crystal material which in response to such alignment at least one of scatters and absorbs light and which in response to an electric field reduces the amount of such scattering or absorption;

a first electrode means for applying said electric field located on one side of the combination of said liquid crystal material and said containment means;

a second electrode means for applying said electric field located on a printed circuit board on the side of the combination of said liquid crystal material and said containment means remote from said first electrode means, said printed circuit board being substantially opaque and said second electrode means adapted to reflect light incident thereon to effect a display; and circuit means located on said printed circuit board and connected in circuit with said first and second electrode means for energizing said first and second electrode means to apply said electric field.

19. The liquid crystal apparatus of claim 18 wherein said first electrode means is supported on a substrate means.

20. The liquid crystal apparatus of claim 19 wherein said second electrode means is formed to have a preestablished pattern of conductive segments, said pattern of conductive segments being substantially parallel to first electrode means.

[21. The liquid crystal apparatus of claim 18 wherein said printed circuit board and said first and second electrode means are substantially optically transparent to electromagnetic radiation in at least a portion of the visible range.]

22. A liquid crystal apparatus, comprising:

a liquid crystal material and containment means for inducing a distorted alignment of said liquid crystal material which in response to such alignment at least one of scatters and absorbs light and which in response to an electric field reduces the amount of such scattering or absorption;

a first electrode means for applying said electric field;

a second electrode means also for applying said electric field located on the side of the combination of said liquid crystal material and said containment means remote from said first electrode means, said second electrode means located on a film; and at least one electrically conductive stripe formed on a first surface of said film for interconnecting said first and second electrode means to a circuit means for energizing said first and second electrode means, said circuit means adapted to be integrated into said conductive stripe.

23. The liquid crystal apparatus of claim 22 further including a circuit means formed on said film and connected in circuit with said first and second electrode means for energizing said first and second electrode means to apply said electric field.

24. The liquid crystal apparatus of claim 23 wherein there are two of said conductive stripes located on said first surface of said film on respective sides thereof and said second electrode means extends between said conductive stripes to be integral therewith.

25. The liquid crystal apparatus of claim 24 wherein said second electrode means is formed to have a preestablished pattern of conductive segments, said pattern of conductive segments being substantially parallel to said first electrode means.

26. The liquid crystal apparatus of claim 25 wherein said conductive segments are electrically connected to a circuit pattern on at least one of said conductive stripes for energization of said conductive segments by means of a component of said circuit means.

27. The liquid crystal apparatus of claim 26 further including at least one electrically conductive stripe located on a second surface of said film remote from said first surface to be substantially aligned with and parallel to one of said conductive strips on said first surface of said film, said component of said circuit means being integrated into conductive stripes located on said first and second surfaces of said film.

28. The liquid crystal apparatus of claim 27 wherein said first electrode means is supported on a substrate means.

29. A liquid crystal apparatus, comprising:

a liquid crystal material and containment means for inducing a distorted alignment of said liquid crystal material which in response to such alignment at least one of scatters and absorbs light and which in response to an electric field reduces the amount of such scattering or absorption;

a first electrode means for applying said electric field located on one side of the combination of said liquid crystal material and said containment means;

a second electrode means for applying said electric field located on the side of the combination of said liquid crystal material and said containment means remote from said first electrode means, said first and second electrode means adapted to effect a visual output display wherein said second electrode means is located on a high-temperature resistant film;

a first electrically conductive stripe located on the same plane of said film as said second electrode means and positioned in close proximity thereto;

a second electrically conductive stripe located on a second surface of said film remote from said first conductive stripe wherein said second conductive stripe is substantially aligned with and parallel to said first conductive stripe; and at least one of said conductive stripes having a circuit means integrated thereinto and connected in circuit with said electrode means for energizing said electrode means.

30. The liquid crystal apparatus of claim 29 further including a third electrically conductive stripe located on the same plane of said film as said second electrode means and spaced from said first conductive stripe wherein said second electrode means extends between said first and second conductive stripes for effecting a visual output display.

31. The liquid crystal apparatus of claim 30 further including a fourth electrically conductive stripe located on a surface of said film remote from said second conductive stripe wherein said fourth conductive stripe is substantially aligned with and parallel to said second conductive stripe.

32. The liquid crystal apparatus of claim 31 wherein said conductive stripes have a circuit pattern formed therein for interconnecting said electrode means to a component of said circuit means for energizing said electrode means, said component adapted to be electrically connected between said conductive stripes that are located on opposite surfaces of said film and substantially aligned and parallel.

33. The liquid crystal apparatus of claim 29 wherein said film is flexible and substantially optically transparent to electromagnetic radiation in at least a portion of the visible range.

34. A method of contructing a liquid crystal apparatus, comprising:

applying a layer of a conductive material to a film;

forming a first conductive stripe on the same plane of said film as said conductive material such that said first conductive stripe is located adjacent to said conductive material;

applying a combination of a liquid crystal material and a containment means to at least said layer of conductive material wherein said containment means is adapted to induce a distorted alignment of said liquid crystal material which in response to such alignment at least one of scatters and absorbs light and which in response to an electric field reduces the amount of such scattering or absorption;

forming a second conductive stripe on the same plane of said film as said conductive material such that said second conductive stripe is spaced from said first conductive stripe with said conductive material extending therebetween; and incorporating into at least one of said conductive stripes a circuit means to be connected in circuit with said conductive material for energizing said conductive material to apply said electric field.

35. The method of claim 34 further including forming a pattern of conductive segments from said conductive material.

36. The method of claim 35 further including applying an electrically conductive substrate to at least the combination of said liquid crystal material and said containment means.

37. The method of claim 35 further including forming a circuit pattern on at least one of said conductive stripes for electrically interconnecting said pattern of conductive segments to a component of said circuit means for energizing said pattern of conductive segments to apply said electric field.

38. The method of claim 37 including forming two additional conductive stripes on the surface of said film opposite from the combination of said liquid crystal material and said containment means such that said additional conductive stripes are substantially aligned with and parallel to respective ones of said conductive stripes formed on the opposite surface of said film wherein said component is integrated into at least one opposed pair of conductive stripes.

39. The method of claim 34 wherein said film is flexible and substantially optically transparent to electromagnetic radiation in at least a portion of the visible range.

40. The liquid crystal apparatus of claim 22 or the method of claim 34 wherein said film is a high-temperature resistant film.

*41. A liquid crystal apparatus, comprising:*

*a liquid crystal material and containment means for inducing a distorted alignment of said liquid crystal material which in response to such alignment at least one of scatters and absorbs light and which in response to an electric field reduces the amount of such scattering or absorption;*

*electrode means for applying said electric field;*

*substrate means for supporting said electrode means, and said liquid crystal material and containment means; and*

*circuit means for energizing said electrode means to apply said electric field, said circuit means electrically connected to said electrode means through an opening extending through said substrate means in the area thereof on which said liquid crystal material and containment means are supported.*

*42. The liquid crystal apparatus of claim 41 wherein said substrate means includes a printed circuit board.*

*43. The liquid crystal apparatus of claim 42 wherein said printed circuit board is substantially opaque.*

*44. The liquid crystal apparatus of claim 42 wherein said printed circuit board is substantially optically transparent to electromagnetic radiation in at least a portion of the visible range.*

*45. The liquid crystal apparatus of claim 41 wherein said substrate means includes two substrates between which said liquid crystal material and said containment means are disposed and said opening is formed in one of said substrates.*

* * * * *